3,700,415
VANADIUM RECOVERY FROM WET PROCESS PHOSPHORIC ACID USING NEUTRAL ORGANO-PHOSPHORUS EXTRACTANTS
Ernest L. Koerner, Jr., and Michael F. Lucid, Oklahoma City, Okla., assignors to Kerr-McGee Corporation, Oklahoma City, Okla.
No Drawing. Filed Feb. 18, 1970, Ser. No. 12,432
Int. Cl. B01d 11/04; C01g 25/22
U.S. Cl. 23—312 ME                                13 Claims

ABSTRACT OF THE DISCLOSURE

A method for the extraction of vanadium (V) from acidic mixtures containing fluoride, phosphate and vanadium comprising effecting the extraction with a neutral organophosphorus complexing agent in a water-immiscible organic solvent, the vanadium being complexed with the complexing agent and being extracted into the organic phase.

BACKGROUND OF THE INVENTION

Phosphoric acid is generally produced commercially by one of two methods. One method is generally called the "furnace" method, and the other is generally referred to as the "wet process" method. In the wet process method of producing phosphoric acid, phosphate rock is contacted with a mineral acid such as sulfuric acid. Most phosphate rock contains metal compounds in varying amounts. In many cases these metal compounds are dissolved from the phosphate rock and appear in the wet process acid as contaminants. Vanadium compounds are among those dissolved from the phosphate rock, particularly when the rock is from the so-called western phosphate deposits of Idaho, Wyoming, Utah, and Montana.

Vanadium is an undesirable component of wet process phosphoric acid in that it prevents the use of the phosphoric acid in making animal feed supplements, as the amount of vanadium must be kept at a low level in such animal feed supplements.

On the other hand, vanadium itself is a valuable material, and wet process phosphoric acid can be an important source of this material. Therefore, a process for recovery of vanadium from wet process phosphoric acid provides an important benefit, in that the vanadium is converted from an undersirable contaminant to a valuable by-product.

There have been many attempts made in the past to recover vanadium from wet process phosphoric acid. One such process involves addition of a soluble ferrocyanide compound to the acid to precipitate the vanadium, as described more fully in U.S. Pat. No. 1,544,911. Other such processes involve extraction of the acid with an organic extractant for the vanadium. U.S. Pat. No. 2,211,119 describes a process in which the preferred organic extractant is isopropyl ether. U.S. Pat. No. 3,437,454 describes a process in which the preferred organic extractant is alpha-hydroxy oximes. While these prior art processes have been successful to some extent, there is a need for an improved process of recovering vanadium from wet process phosphoric acid.

SUMMARY OF THE INVENTION

In accordance with this invention, it has been discovered that vanadium can be recovered from wet process phosphoric acid by extraction of the acid at a pH of from about 0.0 to about 1.5 using an organic extractant comprising a hydrocarbon solvent and a neutral organo-phosphorus compound, for example, tri-n-octyl -phosphine oxide. The vanadium values are extracted from the acid into the organic phase, and the loaded organic phase can then be easily separated from the wet process acid due to the immiscibility of the acid and the organic phase. The vanadium values can then be recovered from the organic phase, as for example by stripping with a suitable stripping solution such as a 10% solution of sodium carbonate. The vanadium may be precipitated from the stripping solution by conventional prior art methods.

Accordingly, it is an object of the present invention to provide an improved solvent extraction process for recovering vanadium from wet process phosphoric acid.

A further object of the invention is to provide a novel extraction method suitable for the recovery of vanadium from acid mixtures containing fluoride.

A further object of this invention is to provide a novel extraction method for the separation of vanadium from phosphoric acid mixtures which contain fluoride.

A further object of the invention is to provide complexing agents which are suitable for the separation of vanadium from phosphoric acid mixtures.

The active extractive agents of this invention are neutral organo-phosphorus compounds having the following general formula:

where R, R' and R" are organic hydrocarbon radicals selected from the group consisting of hydrogen, alkyl, cycloalkyl, aryl, aralkyl, alkoxy and aryloxy radicals. R, R' and R" may be further defined as organic hydrocarbon radicals selected from the group consisting of:

alkyl of up to 12 carbon atoms;
cycloalkyl of up to 12 carbon atoms;
aryl of up to 18 carbon atoms;
aralkyl of up to 18 carbon atoms;
alkoxy of up to 12 carbon atoms; and
aryloxy of up to 18 carbon atoms.

Mixtures of compounds having the general formula as defined above may also be used.

Exemplary alkyl radicals of the above formula are the butyl, amyl, hexyl, and octyl radicals. An exemplary cycloalkyl radical of the present invention is cyclohexyl. As aralkyl radicals may be mentioned the benzyly, phenylethyl, phenylhexyl, naphthylmethyl, and naphthylhexyl radicals. As aromatic radicals according to the above formula may be mentioned phenyl, naphthyl, and anthracyl. As alkoxy radicals may be mentioned the butoxy radical. It is to be understood that the alkyl, aralkyl, and aryl radicals may contain conventional substituents such as halo, nitro, hydroxy, alkoxy, and amino.

In addition to the tertiary phosphine oxides, it is to be understood that within the scope of the claimed invention the corresponding oxonium salts are also comprised. As examples of such oxonium salts may be mentioned tri-n-octyl-phosphinoxonium bisulfate, tri-n-octylphosphinoxonium nitrate, and tri-n-butylphosphinoxonium nitrate.

In addition to the teritary phosphine oxides contemplated as complexing agents of the invention, it has also been discovered that another neutral organo-phosphorus compound, tributylphosphate, can be used as the complexing agent of the method of the present invention to extract vanadium from wet process phosphoric acid.

According to a preferred embodiment of the present invention are the complexing agents wherein R, R' and R'' are alkyl radicals of from 4 to 8 carbon atoms or phenyl radicals.

As preferred complexing agents according to the present invention are mentioned tri-n-octylphosphine oxide, tris (2-ethylhexyl) phosphine oxide, tributylphosphine oxide and triphenylphosphine oxide.

In accordance with the present process, the neutral organo-phosphorus compounds are dissolved in a water-immiscible organic solvent prior to contacting the same with the pentavalent vanadium containing solution. The term "water-immiscible organic solvent" as used herein refers to an organic material normally liquid at ambient temperatures which is substantially, but not necessarily entirely, insoluble in water. The preferred organic solvents for the process of the present invention are the hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents), and the like. Solvents which contain functional groups can also be employed providing that the functional groups do not adversely affect the extraction.

Generally, the neutral organo-phosphorus extractants may be employed in widely varying amounts. Generally, the amount present will be from about 0.3% to 15% by weight based on the total organic phase with an amount of from about one to 6% by weight being particularly preferred. The phosphine oxides useful in the process of the present invention are also characterized as having a solubility of at least 0.3% by weight in the water-immiscible organic solvent used to make up the organic phase and substantially complete insolubility in water.

Tributylphosphate also is effective as the extractant. However, it has been found that it must be present in amounts of from about 25 to 100% by weight of the organic phase.

It has further been found that the addition of tributylphosphate to the organic solvent when a tertiary phosphine oxide is used as the complexing agent will increase the rate of extraction. The addition of amines and amine salts to the organic solvent also has been found to increase the rate of extraction.

In the case of some acidic solutions, it has been found that not only can mixtures of phosphine oxides and amines or amine salts extract vanadium (V) from acidic solutions, but, furthermore, the combination of these reagents gives better extraction than each reagent alone at equivalent concentration. The combination of reagents can be used at a lower pH than the conventional amines and amine salts.

Although it would be expected that the use of a complexing agent in the recovery of vanadium would be rendered rather expensive and therefore impractical due to the degradation of the complexing agent, it has been found that with the complexing agents of the present method, remarkably little degradation occurs. This is particularly the case with respect to the complexing agent tri-n-octylphosphine oxide.

It has been found in the practice of this invention that fluoride must be present in the acidic mixture in order for the complexing agents of the present invention to properly complex the vanadium (V). Although the exact theory of the complexing is not known, it is believed that the fluoride is complexed with the vanadium (V) and the complexing agent.

The amiunt of fluoride present in the mixture preferably is about 0.25 mole per mole of vanadium present although a large excess of fluoride does not harm the extraction.

The effect of fluoride on the extraction of vanadium from the acid is demonstrated from the following experiment.

An aqueous feed containing 30% pure $P_2O_5$ as phosphoric acid and 1.30 g./l. $V_2O_5$ was added to 0.10 M tri-n-octylphosphine oxide in Soltrol 170 solvent with an aqueous to organic ratio of 1:1 with a contact time of ten minutes. At the conclusion of the experiment, the aqueous raffinate contained 1.30 g./l. $V_2O_5$, i.e., no vanadium was observed to be extracted by the organic phase.

The experiment was repeated with the sole change being the addition of 2 g./l. NaF in the aqueous feed. At the end of the experiment, only 0.33 g./l. $V_2O_5$ was observed in the aqueous raffinate, clearly demonstrating that the presence of fluoride is essential to the success of the extraction process.

Fluoride is a natural component of wet process phosphoric acid and therefore wet process phosphoric acid is particularly suited for the extraction process of the present invention.

With respect to the treatment of wet process phosphoric acid, the present invention comprises the treatment of the raw acid with an oxidizing agent prior to extraction, so that the vanadium is converted to the pentavalent state. Without converting the vanadium to the pentavalent state, the extraction process with the complexing agents of the invention is not satisfactory, as vanadium in the lower oxidation state does not form a complex with the extractants contemplated within the scope of the invention.

The amount of organic extractant phase to be used for most efficient extraction is from about 0.15 to 10 times the volume of wet process acid to be treated. The ratio of organic extractant phase to wet acid phase to be used is dependent on the concentration of neutral organo-phosphorus in the extractant phase, the temperature at which the extraction is performed, the contact time between the two phases and the amount of $V_2O_5$ in the wet process acid.

It has been found that for the case of tri-n-octylphosphine oxide (TOPO), most efficient extraction of $V_2O_5$ is obtained when two to ten moles of TOPO per mole of vanadium present in the wet acid is used in the organic phase with four to eight moles of TOPO per mole of vanadium being particularly preferred. Thus it can be seen that the ratio of organic extractant phase to wet acid phase is dependent on the concentration of TOPO in the extractant phase. As previously stated, the concentration of extractant can be from about 0.3 to 15% by weight. A preferred extractant concentration for TOPO is 0.10 molar in which case an organic to aqueous ratio of from about 0.35 to 1.7 would be required to provide four to eight moles of TOPO per mole of vanadium present in the wet acid. Although higher concentrations of extractant might be used, it has been found that in such instances the liquid mixture tends to separate too slowly into the organic and aqueous phases.

In general, the extraction efficiency decreases as the temperature is increased, although in some instances it may not be practical to operate at ambient temperature conditions.

It has been found that contact time between the organic extractant phase and the wet acid phase is an important variable to consider when extracting vanadium from wet acid. Longer contact times result in increased vanadium extraction. In practice, contact times of from about one minute to 60 are satisfactory with about 5 minutes to 30 minutes per contact being especially preferred at temperatures of from about 30°–50° C.

The extraction is performed on a batch basis, or on a continuous basis, such as in a continuous countercurrent multistage extraction system.

When the extraction is performed in accordance with the above preferred embodiments, the distribution ratio K will generally be at a maximum. K is defined as the ratio of vanadium in the organic phase to the vanadium in the aqueous phase, both expressed in equivalent terms, such as in grams per liter.

The foregoing description and the following specific examples are for purposes of illustration, and are not to be considered as limiting the scope of the invention, reference being had to the appended claims for this purpose.

EXAMPLE I

A sample of wet process phosphoric acid from a commercial acid plant and having a pH of about 0.5 and a vanadium content, expressed as $V_2O_5$ of 1.56 grams per liter was oxidized with sodium chlorate and contacted with hexane containing tri-n-octyl phosphine oxide (TOPO) at ambient temperature. The concentration of TOPO and contact times were varied as described in Table I. After the two phases were contacted for the desired length of time, the phases were allowed to separate due to their immiscibility and the phases assayed for their vanadium content.

The data in Table I show that vanadium extraction increased with increasing contact time for comparable conditions of TOPO concentration in the organic phase and organic to aqueous ratio. The data also show the variation in vanadium extraction efficiency, as expressed by $K = V_2O_5$ (org.)$/V_2O_5$ (aq.), for different TOPO concentrations in the organic phase. Generally, higher TOPO concentrations in the organic phase resulted in higher vanadium extraction efficiency when the same amount of TOPO, expressed as moles TOPO/mole vanadium, was present.

TABLE I

| TOPO molarity | Moles TOPO/mole vanadium | Organic/ aqueous | Contact time, minutes | $K = \dfrac{V_2O_5 \text{ (Org.)}}{V_2O_5 \text{ (Aq.)}}$ |
|---|---|---|---|---|
| 0.03 | 2 | 1.14 | 1 | 0.15 |
| 0.03 | 2 | 1.14 | 2 | 0.39 |
| 0.03 | 2 | 1.14 | 5 | 0.75 |
| 0.03 | 2 | 1.14 | 10 | 0.99 |
| 0.03 | 2 | 1.14 | 20 | 1.39 |
| 0.03 | 4 | 2.28 | 1 | 0.12 |
| 0.03 | 4 | 2.28 | 2 | 0.23 |
| 0.03 | 4 | 2.28 | 5 | 0.75 |
| 0.03 | 4 | 2.28 | 10 | 0.87 |
| 0.03 | 4 | 2.28 | 20 | 1.13 |
| 0.03 | 6 | 3.42 | 2 | 0.21 |
| 0.03 | 6 | 3.42 | 5 | 0.41 |
| 0.03 | 6 | 3.42 | 10 | 0.69 |
| 0.03 | 6 | 3.42 | 20 | 1.02 |
| 0.03 | 8 | 4.56 | 2 | 0.77 |
| 0.03 | 8 | 4.56 | 5 | 1.16 |
| 0.03 | 8 | 4.56 | 10 | 1.42 |
| 0.03 | 8 | 4.56 | 20 | 1.51 |
| 0.03 | 10 | 5.70 | 2 | 0.40 |
| 0.03 | 10 | 5.70 | 5 | 0.89 |
| 0.03 | 10 | 5.70 | 10 | 1.08 |
| 0.03 | 10 | 5.70 | 20 | 1.21 |
| 0.0477 | 2 | 0.688 | 2 | 0.87 |
| 0.0477 | 2 | 0.688 | 5 | 1.53 |
| 0.0477 | 2 | 0.688 | 10 | 2.03 |
| 0.0477 | 2 | 0.688 | 20 | 2.44 |
| 0.0477 | 4 | 1.376 | 2 | 0.58 |
| 0.0477 | 4 | 1.376 | 5 | 1.01 |
| 0.0477 | 4 | 1.376 | 10 | 1.66 |
| 0.0477 | 4 | 1.376 | 20 | 2.29 |
| 0.0477 | 6 | 2.064 | 2 | 0.45 |
| 0.0477 | 6 | 2.064 | 5 | 0.96 |
| 0.0477 | 6 | 2.064 | 10 | 1.43 |
| 0.0477 | 6 | 2.064 | 20 | 2.25 |
| 0.0477 | 8 | 2.744 | 2 | 0.40 |
| 0.0477 | 8 | 2.744 | 5 | 0.83 |
| 0.0477 | 8 | 2.744 | 10 | 1.38 |
| 0.0477 | 8 | 2.744 | 20 | 2.03 |
| 0.0477 | 10 | 3.440 | 2 | 0.36 |
| 0.0477 | 10 | 3.440 | 5 | 0.73 |
| 0.0477 | 10 | 3.440 | 10 | 1.24 |
| 0.0477 | 10 | 3.440 | 20 | 2.00 |
| 0.075 | 2 | 0.460 | 2 | 1.73 |
| 0.075 | 2 | 0.460 | 5 | 3.03 |
| 0.075 | 2 | 0.460 | 10 | 4.31 |
| 0.075 | 2 | 0.460 | 20 | 5.29 |
| 0.075 | 4 | 0.920 | 2 | 1.20 |
| 0.075 | 4 | 0.920 | 5 | 2.15 |
| 0.075 | 4 | 0.920 | 10 | 3.32 |
| 0.075 | 4 | 0.920 | 20 | 4.45 |
| 0.075 | 6 | 1.380 | 2 | 0.91 |
| 0.075 | 6 | 1.380 | 5 | 1.82 |
| 0.075 | 6 | 1.380 | 10 | 2.64 |
| 0.075 | 6 | 1.380 | 20 | 4.05 |
| 0.075 | 8 | 1.840 | 2 | 0.86 |
| 0.075 | 8 | 1.840 | 5 | 1.41 |
| 0.075 | 8 | 1.840 | 10 | 2.64 |
| 0.075 | 8 | 1.840 | 20 | 3.55 |
| 0.075 | 10 | 2.300 | 2 | 0.77 |
| 0.075 | 10 | 2.300 | 5 | 1.59 |
| 0.075 | 10 | 2.300 | 10 | 2.43 |
| 0.075 | 10 | 2.300 | 20 | 3.18 |
| 0.0954 | 2 | 0.344 | 2 | 2.26 |
| 0.0954 | 2 | 0.344 | 5 | 6.47 |
| 0.0954 | 2 | 0.344 | 10 | 8.58 |
| 0.0954 | 2 | 0.344 | 20 | 4.92 |
| 0.0954 | 4 | 0.688 | 2 | 2.50 |
| 0.0954 | 4 | 0.688 | 5 | 4.15 |
| 0.0954 | 4 | 0.688 | 10 | 5.97 |
| 0.0954 | 4 | 0.688 | 20 | 7.07 |
| 0.0954 | 6 | 1.032 | 2 | 1.67 |
| 0.0954 | 6 | 1.032 | 5 | 3.40 |
| 0.0954 | 6 | 1.032 | 10 | 4.13 |
| 0.0954 | 6 | 1.032 | 20 | 6.33 |
| 0.0954 | 8 | 1.376 | 2 | 1.32 |
| 0.0954 | 8 | 1.376 | 5 | 2.46 |
| 0.0954 | 8 | 1.376 | 10 | 3.53 |
| 0.0954 | 8 | 1.376 | 20 | 4.74 |
| 0.0954 | 10 | 1.720 | 2 | 1.15 |
| 0.0954 | 10 | 1.720 | 5 | 2.29 |
| 0.0954 | 10 | 1.720 | 10 | 3.41 |
| 0.0954 | 10 | 1.720 | 20 | 5.16 |
| 0.125 | 4 | 0.552 | 2 | 4.25 |
| 0.125 | 4 | 0.552 | 5 | 6.16 |
| 0.125 | 4 | 0.552 | 10 | 6.64 |
| 0.125 | 4 | 0.552 | 20 | 10.30 |
| 0.125 | 6 | 0.824 | 2 | 3.03 |
| 0.125 | 6 | 0.824 | 5 | 4.63 |
| 0.125 | 6 | 0.824 | 10 | 5.46 |
| 0.125 | 6 | 0.824 | 20 | 11.20 |
| 0.150 | 4 | 0.464 | 2 | 2.72 |
| 0.150 | 4 | 0.464 | 5 | 15.30 |
| 0.150 | 4 | 0.464 | 10 | 12.30 |
| 0.150 | 4 | 0.464 | 20 | 8.90 |
| 0.150 | 6 | 0.696 | 2 | 3.37 |
| 0.150 | 6 | 0.696 | 5 | 6.46 |
| 0.150 | 6 | 0.696 | 10 | 8.17 |
| 0.150 | 6 | 0.696 | 20 | 9.68 |
| 0.200 | 4 | 0.344 | 2 | 4.20 |
| 0.200 | 4 | 0.344 | 5 | 7.51 |
| 0.200 | 4 | 0.344 | 10 | 11.10 |
| 0.200 | 4 | 0.344 | 20 | 13.70 |
| 0.200 | 6 | 0.516 | 2 | 31.20 |
| 0.200 | 6 | 0.516 | 5 | 25.20 |
| 0.200 | 6 | 0.516 | 10 | 19.40 |
| 0.200 | 6 | 0.516 | 20 | 19.40 |

EXAMPLE II

This example illustrates the decrease in extraction efficiency with increase in contact temperature, for like time periods, at which the extraction was performed. The procedure used in Example I was followed. The results are shown in Table II.

TABLE II

| Temp. (°C.) | TOPO molarity | Moles TOPO/mole vanadium | Organic aqueous | Contact time, minutes | $K=\dfrac{V_2O_5 \text{ (Org.)}}{V_2O_5 \text{ (Aq.)}}$ |
|---|---|---|---|---|---|
| 25 | 0.0954 | 6 | 1.03 | 2 | 1.67 |
| 25 | 0.0954 | 6 | 1.03 | 5 | 3.40 |
| 25 | 0.0954 | 6 | 1.03 | 10 | 4.13 |
| 25 | 0.0954 | 6 | 1.03 | 20 | 6.33 |
| 50 | 0.10 | 6 | 1.0 | 5 | 2.28 |
| 50 | 0.10 | 6 | 1.0 | 10 | 3.05 |
| 50 | 0.10 | 6 | 1.0 | 20 | 3.53 |
| 50 | 0.10 |   | 1.0 | 30 | 3.53 |
| 25 | 0.125 | 6 | 0.824 | 5 | 4.63 |
| 25 | 0.125 | 6 | 0.824 | 10 | 5.46 |
| 25 | 0.125 | 6 | 0.824 | 20 | 11.2 |
| 50 | 0.125 | 6 | 0.824 | 5 | 3.03 |
| 50 | 0.125 | 6 | 0.824 | 10 | 4.25 |
| 50 | 0.125 | 6 | 0.824 | 20 | 4.58 |
| 25 | 0.15 | 6 | 0.696 | 5 | 6.46 |
| 25 | 0.15 | 6 | 0.696 | 10 | 8.17 |
| 25 | 0.15 | 6 | 0.696 | 20 | 9.68 |
| 50 | 0.15 | 6 | 0.696 | 5 | 3.83 |
| 50 | 0.15 | 6 | 0.696 | 10 | 4.88 |
| 50 | 0.15 | 6 | 0.696 | 20 | 5.47 |

EXAMPLE III

As indicated hereinabove, tributylphosphate can be used in place of the preferred tertiary phosphine oxides as a complexing agent. Thus, a sample of wet process phosphoric acid with a vanadium content of 1.73 g. $V_2O_5$/l. was oxidized with sodium chlorate and contacted with equal volumes of tributyl phosphate or tributyl phosphate-kerosene solvents at ambient temperature. The phases were agitated for five minutes and the two phases allowed to separate. The results in Table III show that tributyl phosphate extracts vanadium from wet process phosphoric acid.

TABLE III

| Vol. percent TBP in kerosene | Aqueous (g. $V_2O_5$/l.) | Organic (g. $V_2O_5$/l.) | $K_{oa}$ |
|---|---|---|---|
| 0 | 1.73 | | |
| 25 | .86 | .87 | 1.01 |
| 50 | .69 | 1.04 | 1.51 |
| 100 | .27 | 1.46 | 5.41 |

After extraction of the vanadium (V) in the organic phase, the vanadium is purified through a series of procedures involving scrubbing of the organic phase, stripping of the solvent with an alkaline agent such as sodium carbonate and precipitation of any remaining phosphorus and fluoride with calcium chloride and magnesium oxide.

Following the purification steps, the purified carbonate solution containing the vanadium can be precipitated by the addition of an agent such as ammonium sulfate to form the metavanadate.

The metavanadate can be calcined to vanadium oxide ($V_2O_5$) or fused to produce fused flake.

The wet process phosphoric acid used as the starting material of this recovery process is produced by the reaction of sulfuric acid and phosphate rock, where filtration has removed the calcium sulfate. The vanadium present in the wet process phosphoric acid is generally in the form of vanadium (III) and/or vanadium (IV), the vanadium being complexed with phosphate and fluoride.

Other elements in low oxidation states are also present in the freshly prepared acid. These metals consume oxidant when the vanadium is oxidized. The most important other oxidant consumer is ferrous iron because the other metals [chromium (III) and manganese (II)] are more difficult to oxidize than vanadium. However, if the acid is over-oxidized, these metals will also consume oxidant. Normally, all of the vanadium is in the pentavalent state at an EMF of 950 mev. as measured against a standard calomel electrode. An optimum degree of oxidation of the wet acid is about 1030±20 mev. Oxidation of the wet phosphoric acid is generally necessary in order to convert the lower oxidation state vanadium to vanadium (V), as it has been found that the vanadium must be in this higher oxidation state in order to be complexed with the complexing agents of the present invention to effect the extraction.

The oxidation temperature is not critical and as an example of a suitable temperature may be mentioned 50° C.

Various oxidizing agents may be used such as chlorates, manganese dioxide, permanganates, dichromates, peroxydisulfates, and ceric salts. Preferred oxidizing agents are sodium chlorate and manganese dioxide.

According to a preferred embodiment of the invention, where a temperature of 50° C. has been used in the oxidation stage, the oxidized acid is cooled in a heat exchanger to a temperature of about 40° C. and thereafter passed to a thickener. It is to be understood that at each decrease in temperature, precipitation of gypsum and sodium fluorosilicate occurs. The thickener underflow containing the solids is returned to a filter with the overflow being sent to solvent extraction feed storage. Prior to use in the extraction procedure, oxidized wet process phosphoric acid may be filtered, if necessary.

As an alternative to the use of wet process phosphoric acid which has not been oxidized prior to the present oxidation step, the wet process phosphoric acid may be partially oxidized with air with the aid of catalysts such as copper (II). This "pre-oxidation" step partially oxidizes the wet process phosphoric acid, allowing the use of lesser amounts of oxidant in the oxidation step described above with sodium chlorate.

A preferred method of extracting the vanadium (V) is to add the oxidized wet process phosphoric acid to an apparatus with six countercurrent stages, where the oxidized wet process phosphoric acid is metered into the stage one mixer and 0.10 M tri-n-octylphosphine oxide in Napoleum 470 kerosene is metered into stage six mixer at an organic/aqueous flow ratio of 1:1. Under these conditions the equilibrium mixing times are ten minutes in each stage. The aqueous raffinate exits from the stage six settler and passes to a raffinate re-entrainer tank to allow entrained solvent to separate for recovery and return to the stage six mixer. The vanadium (V) loaded solvent overflows from stage one settler into a de-entrainer tank to remove entrained aqueous.

EXAMPLE IV

In this example, 0.10 M tri-n-octylphosphine oxide in kerosene solvent was used. Traces of phosphine in the phosphine oxide extraction agent and impurities in the kerosene solvent caused some reduction of the pentavalent vanadium to render it non-extractable. By recycling the solvent in a continuous laboratory countercurrent extractor, the reducing impurities were eliminated from the solvent after a few cycles. The aqueous to organic ratio was maintained at 1:1, a contact time of 10 minutes was used, and the extraction was conducted at 40° C. After equilibrium was reached, the equilibrium organic and aqueous stages were assayed for vanadium content. The results are shown in Table IV.

TABLE IV

| Stage | Aqueous $V_2O_5$(g./l.) | Organic $V_2O_5$(g./l.) |
|---|---|---|
| Feed | 1.16 | 0.16 |
| 1 | .61 | 1.11 |
| 2 | .42 | .50 |
| 3 | .31 | .29 |
| 4 | .29 | .10 |
| 5 | .24 | .19 |
| 6 | .22 | .18 |

The preferred embodiment for the extraction of the vanadium (V) can be varied with respect to the number of stages and the apparatus utilized. The ratio of the aqueous to organic phases can be varied as can the ratio of extracting agent to organic diluent. The type of apparatus can similarly be varied within the scope of the invention, and it is within the scope of the present invention to use any apparatus which will allow mixing of the components and the separation of the two phases.

The aqueous phase containing the phosphoric acid largely free from vanadium, the raffinate of the previous step, can be used as the feed material for the manufacture of fertilizers and animal food supplements. Because of the overall efficiency with which vanadium is removed from the wet process phosphoric acid via the use of the specific complexing agents of the present invention, it is now possible to use wet process phosphoric sources with an appreciable amount of vanadium, such as western phosphate, for the preparation of animal food supplement products where vanadium must not be present in large quantities.

Thus, where tri-n-octylphosphine oxide is used as the complexing agent according to the preferred embodiment of the present invention, the extraction efficiency in the separation of vanadium oxide ranged from 80.5% for low vanadium content wet phosphoric acid (i.e., 1.18 g. $V_2O_5$/l.) to 86.9% for high vanadium content wet phosphoric acid (i.e., 1.60 g. $V_2O_5$/l.), or an average extraction efficiency of 84.5% (based upon 1.424 g. $V_2O_5$/l.). It is accordingly seen that the level of vanadium present in the aqueous phase is well below the level of 0.25 g. $V_2O_5$/l. found acceptable for animal food supplements.

It was furthermore observed that there was no indication of loss of the complexing agent through degradation or aqueous solubility, thus making the use of the complexing agents of the present invention economical.

The organic phase contains, in addition to vanadium (V), coextracted phosphate and fluoride as impurities. In order to remove such impurities, the organic phase is scrubbed preferably with water.

Analysis of loaded solvent samples showed that free phosphoric acid and some fluoride species were competing with the vanadium for extractant. Direct stripping of the loaded solvent with sodium carbonate solution would yield a sodium vanadate liquor contaminated with large amounts of phosphate and fluoride. Recovery of ammonium metavanadate from such a liquor would give low vanadium recovery and poor product quality.

It has been found that co-extracted phosphate, fluoride and silica can be removed from the vanadium-loaded solvent by scrubbing the solvent with water between pH 0.5 and 4.0 with a pH range of 0.5 to 3.0 being particularly preferred. The efficiency of the scrub step was demonstrated by the following example:

EXAMPLE V

A sample of loaded solvent containing 1.42 g./l. $V_2O_5$, 1.14 g./l. phosphorus (P), 0.36 g./l. fluoride (F), and 0.05 g./l. silicon (Si) was contacted at ambient temperature with an equal volume of water and the equilibrium pH of the mixture adjusted to the desired level with a small amount of sulfuric acid. The scrub aqueous and organic phases were agitated for five minutes and then allowed to separate. The following Table V illustrates the effectiveness of the scrub operation as a function of pH.

TABLE V

| Scrub pH | Aqueous scrub solution, g./l. | | | | Percent stripped | | |
|---|---|---|---|---|---|---|---|
| | $V_2O_5$ | P | F | Si | $V_2O_5$ | P | PSi |
| 0.5 | 0.07 | 0.59 | 0.26 | 0.07 | 4.9 | 51.7 | 72.3 | 100 |
| 1.0 | 0 | 0.61 | 0.26 | 0.07 | 0 | 53.5 | 72.3 | 100 |
| 1.5 | 0 | 0.59 | 0.26 | 0.06 | 0 | 51.7 | 72.3 | 100 |
| 2.0 | 0 | 0.60 | 0.24 | 0.05 | 0 | 52.6 | 66.6 | 100 |
| 2.5 | 0 | 0.64 | 0.28 | 0.05 | 0 | 56.1 | 77.8 | 100 |
| 3.0 | 0.26 | 0.86 | 0.33 | 0.04 | 18.3 | 75.5 | 91.6 | 80 |
| 3.5 | 0.75 | 0.94 | 0.32 | 0.04 | 52.8 | 82.5 | 88.9 | 80 |
| 4.0 | 1.07 | 1.01 | 0.32 | 0.04 | 75.3 | 88.7 | 88.9 | 80 |

According to a preferred method, a scrub circuit comprising one mixer-settler stage is provided. Water is metered to the scrub stage mixer where it is contacted with the loaded solvent of the previous step. The amount of water used is such that the ratio of the organic to aqueous is preferably about 5:2. For this case, a natural well water having a pH of 7.5 resulted in an equilibrium pH of 2.5 to 3.0 in the scrub operation and further resulted in 75% of the co-extracted phosphate and fluoride and 100% of the co-extracted silica being transferred to the aqueous phase.

The number of stages in the scrub circuit can be varied and operated either co-currently or counter-currently as the conditions require. Similarly, the amount of water to be used relative to the amount of solvent phase can be varied. Optimum conditions as to the number of stages, the amount of water and the equilibrium pH can be determined by tests known to those skilled in the art.

The aqueous scrub liquor exits from the settler and is further allowed to settle in a solvent de-entrainer. The aqueous scrub liquor containing phosphate, fluoride and a small amount of vanadium is returned to the circuit as wash water.

The scrubbed solvent is clear and can be fed directly to the vanadium-stripping stage. As an optional procedure, to prevent aqueous scrub carryover, the scrubbed solvent can be passed to a de-entrainer tank.

Instead of water, inorganic salt solutions such as sodium chloride, sodium sulfate, sodium nitrate, ammonium chloride, ammonium sulfate and ammonium nitrate, and the like, can be used as scrub solutions. In fact, when certain of these salts were used, vanadium removal was increased.

The vanadium is stripped from the solvent with an alkaline agent. Alkaline agents which may be used include ammonia, sodium hydroxide, sodium carbonate, ammonia-ammonia chloride mixtures, ammonia-ammonium sulfate mixtures and the like, sodium carbonate being preferred.

As alternate stripping agents, sulfur dioxide solutions, sulfurous acid-sulfuric acid mixtures and other vanadium reducing agents may be used. In such cases the vanadium is stripped from the extractant by reducing the pentavalent vanadium to tetravalent vanadium. Tetravalent vanadium is not extracted by neutral organo-phosphorus extracting agents and thus reports to the aqueous phase.

According to a preferred stripping method of the present invention, the vanadium is stripped from the solvent with sodium carbonate solution. The strip operation is controlled by maintaining a pH of about 5.5 to about 5.75 in the strip mixer through a pH controller that operates an automatic valve. The volume of sodium carbonate solution entering the mixer is quite small so that the resulting aqueous strip liquor is concentrated in vanadium values. Strip liquors containing 20–100 g. $V_2O_5/l.$ can be easily produced by this procedure by adjusting the concentration of the sodium carbonate strip solution.

The strip solution containing the vanadium is removed from the settler and passes to a de-entrainer to remove entrained solvent. The stripped solvent containing the complexing agent also passes to a de-entrainer to remove entrained aqueous and then is pumped to a solvent storage tank for recycle to the extraction procedure.

The strip solution containing the recovered vanadium contains minor quantities of phosphate and fluoride which are removed by precipitation with calcium chloride and magnesium oxide.

According to a preferred embodiment, soda ash is added to maintain the pH at about 8.0. To the batch is added a calcium chloride solution to precipitate about 75% of the phosphate remaining at this stage.

After allowing a reaction time of about four hours, ammonia is added to raise the pH to about 9.0 and magnesium oxide is added to precipitate the remaining phosphate. The reaction is allowed to proceed for about twelve hours during which time the temperature is maintained at about 60° C.

The precipitated solids are removed from the purified vanadium solution by filtration. Entrained mother liquor is recovered by washing the cake with water, and the wash is added to the vanadium liquor.

As a further example of the treatment of the strip solution, vanadium strip solution containing 60 g. $V_2O_5/l.$, 20 g. P/l., and 5.7 g. F/l. is subjected to the following procedure.

Calcium chloride in an amount of 60% of the stoichiometric quantity necessary to precipitate the phosphate as calcium hydroxyapatite $[Ca_5(OH)(PO_4)_3]$ and the fluoride as calcium fluoride $[CaF_2]$ is added to the vanadium strip solution. Sodium carbonate is added to maintain the pH of the solution above 7.0 by neutralizing the HCl produced. The solution is maintained at 60° C., while stirring for one hour. About 77% of the phosphate and 88% of the fluoride precipitate by the end of this period. The remaining phosphate then is precipitated as magnesium ammonium phosphate $[MgNH_4PO_4]$ by adding twice the stoichiometric quantity of magnesium oxide to the slurry after adjusting the pH to 9.0 with ammonia. The solution temperature is maintained at 60° C. for 8 to 12 hours to complete the reaction. The solution then is filtered and the cake washed with hot water. Less than 1% of the vanadium is found in the filter cake.

The purified solution containing the vanadium is precipitated batch-wise to recover the vanadium in the form of ammonium metavanadate.

According to a preferred procedure, ammonium sulfate is added to a warm solution to salt out the ammonium metavanadate. The solution is heated to dissolve the ammonium sulfate if necessary. Cooling the solution in as short a time as practical to a temperature of about 20° C. to 25° C. provides a rapid and efficient precipitation. The ammonium metavanadate is recovered by filtration. A water wash is used to remove entrained ammonium sulfate mother liquor from the ammonium metavanadate cake. The filtrate and wash water are discarded. The ammonium metavanadate is calcined to vanadium oxide or fused to produce fused flake.

What is claimed is:
1. A process comprising:
contacting an aqueous phosphoric acid acidic mixture containing vanadium in the pentavalent state, phosphoric acid and at least about 0.25 mole fluoride per mole vanadium, said acidic mixture having a pH of from about 0.0 to about 1.5, with an organic solvent and at least one complexing agent consisting of neutral organo-phosphorus compounds and oxonium salts thereof, said compounds having the formula

wherein R, R' and R" are selected from the group consisting of hydrogen, alkyl, cycloalkyl, aryl, aralkyl, alkoxy and aryloxy radicals to form an organic phase containing the vanadium separate from an aqueous phase and removing the organic phase containing the vanadium.

2. A process as set forth in claim 1 in which the vanadium is removed from said organic phase.

3. A process as set forth in claim 1 in which the vanadium is removed from said organic phase by treatment with an alkaline stripping solution.

4. A process as set forth in claim 1 in which the complexing agent is present in an amount within about 0.3% to 15% by weight, based on the total weight of the organic solvent and complexing agent.

5. A process as set forth in claim 1 in which the rate of extraction of said vanadium is increased by adding at least one compound selected from the group consisting of tributylphosphate, amines and amine salts.

6. A process as set forth in claim 1 in which the vanadium in the acidic mixture is oxidized to convert it to the pentavalent state.

7. A process as set forth in claim 1 in which about 0.15 to 10 volumes of organic solvent and complexing agent are employed for each volume of acidic mixture.

8. A process as set forth in claim 1 in which the acidic mixture is contacted with the organic solvent and complexing agent for a period of from about one to sixty minutes.

9. A process as set forth in claim 1 in which the complexing agent is tri-n-octylphosphine oxide.

10. A process as set forth in claim 1 in which the complexing agent is tris(2-ethylhexyl) phosphine oxide.

11. A process as set forth in claim 1 in which the complexing agent is tributylphosphine oxide.

12. A process as set forth in claim 1 in which the complexing agent is triphenylphosphine oxide.

13. A process as set forth in claim 1 in which the extraction is carried out continuously with the acidic mixture being contacted countercurrently with the organic solvent and complexing agent.

References Cited

UNITED STATES PATENTS

| | | | |
|---|---|---|---|
| 3,206,276 | 9/1965 | Burwell | 23—312 ME |
| 3,206,277 | 9/1965 | Burwell | 23—312 ME |
| 3,131,993 | 5/1964 | Gustison | 23—312 ME |
| 2,937,925 | 5/1960 | Blake | 23—312 ME |
| 2,864,668 | 12/1958 | Baldwin | 23—312 ME |
| 2,859,904 | 11/1958 | Schmitt | 23—312 ME |
| 2,812,233 | 11/1957 | Lewis | 23—312 ME |

FOREIGN PATENTS

| | | | |
|---|---|---|---|
| 245,763 | 7/1963 | Australia | 23—19.1 |
| 70,866 | 1/1970 | Germany | 23—19.1 |

OTHER REFERENCES

Nuclear Science Abstracts, vol. 10, No. 18A, Sept. 10, 1956, p. 905, No. 7573.

Nuclear Science Abstracts, vol. 16, No. 11, June 15, 1962, p. 169, No. 13136.

Nuclear Science Abstracts, vol. 20, No. 11, June 15, 1966, p. 2277e8, No. 18561.

Nuclear Science Abstracts, vol. 15, No. 9, May 15, 1961, p. 1418, No. 11065.

(Other references on following page)

OTHER REFERENCES

Nuclear Science Abstracts, vol. 11, No. 5, Mar. 15, 1957, p. 309, No. 2855.

Nuclear Science Abstracts, vol. 11, No. 3, February 1957, p. 153, No. 1430.

Nuclear Science Abstracts, vol. 11, No. 4, February 1957, pp. 253–254, No. 2356.

Nuclear Science Abstracts, vol. 17, No. 20, October 1963, p. 4554, No. 3406.

Ishimori: Nippon Genshiryokii Gakkaishi, vol. 4, No. 2, 1962, pp. 117–125.

NORMAN YUDKOFF, Primary Examiner

S. J. EMERY, Assistant Examiner

U.S. Cl. X.R.

23—19 V, 140, 165 C, 312 P